United States Patent
Tuunanen et al.

(10) Patent No.: US 6,393,121 B1
(45) Date of Patent: May 21, 2002

(54) METHOD OF EXITING COLLECT INFORMATION PHASE IN INTELLIGENT NETWORK

(75) Inventors: Heikki Tuunanen, Espoo; Andrei Krüger, Helsinki, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/331,874

(22) PCT Filed: Oct. 26, 1998

(86) PCT No.: PCT/FI98/00831

§ 371 Date: Jun. 29, 1999

§ 102(e) Date: Jun. 29, 1999

(87) PCT Pub. No.: WO99/29121

PCT Pub. Date: Jun. 10, 1999

(30) Foreign Application Priority Data

Oct. 30, 1997 (FI) .................................. 974100

(51) Int. Cl.⁷ .......................... H04M 7/00; H04M 15/00
(52) U.S. Cl. ........................................ 379/230; 379/133
(58) Field of Search .................. 379/111, 113, 379/133, 134, 207, 219, 229, 230

(56) References Cited

U.S. PATENT DOCUMENTS

| | | | | |
|---|---|---|---|---|
| 5,937,053 A | * | 8/1999 | Lee et al. | 379/220 |
| 5,991,389 A | * | 11/1999 | Ram et al. | 379/230 |
| 6,028,924 A | * | 2/2000 | Ram et al. | 379/229 |
| 6,038,309 A | * | 3/2000 | Ram et al. | 379/229 |
| 6,195,427 B1 | * | 2/2001 | Hansen et al. | 379/352 |
| 6,222,917 B1 | * | 4/2001 | Gates | 379/216 |
| 6,243,443 B1 | * | 6/2001 | Low et al. | 379/88.17 |

FOREIGN PATENT DOCUMENTS

| | | | | |
|---|---|---|---|---|
| EP | 667 722 | | 8/1995 | H04Q/3/00 |
| WO | 97/36431 | | 10/1997 | H04Q/3/00 |
| WO | WO 99/29121 | * | 6/1999 | H04Q/3/00 |

* cited by examiner

*Primary Examiner*—Binh Tieu
(74) *Attorney, Agent, or Firm*—Pillsbury Winthrop LLP (57) ABSTRACT

The invention relates to a method of existing a collect information phase at an IN service switching pont in such a way that call set-up control is transferred from the IN service switching point (SSP) to the control point (SCP), even though the maximum of information requested as additional information by the IN service control point has not been received. In the method, a new condition (EE) is determined for the collecting phase (PIC2) and after the condition is fulfilled, the collecting phase is exited in such a way that the service control point (SCP) can make a decision how the call will be continued. The condition (EE) is either the maximum collecting time (collectTimer), which determines for how long the collecting of information is allowed to take at the most, or the minimum number (minNumberOfDigits), which determines how may digits as least have to be collected. The invention further related to an intelligent network, an IN service control point and an IN service switching point, to which the method can be applied.

16 Claims, 4 Drawing Sheets

METHOD OF EXITING COLLECT INFORMATION PHASE IN INTELLIGENT NETWORK

BACKGROUND OF THE INVENTION

The invention relates to set-up of a call using an intelligent network service and in particular to a phase in the call set-up in which information is collected from a subscriber.

By means of an intelligent network (IN) a large number of different services can be offered to the subscriber to a telecommunication network, for instance a fixed telephone network or a mobile telephone network, These services comprise, for instance, a virtual private network (VPN), which enables the use of private numbers, and a personal number, in which the IN re-routes calls made to the personal number in a manner controlled by the subscriber. One example of the IN of this kind is described in the ITU-T (the International Telecommunications Union) recommendations of Q.1200 series. The invention and its background will be described in the following by using the CoreINAP terminology of the standard ETS 300 374-1, but the invention can also be applied to intelligent networks implemented by other IN standards, In the intelligent network, connection arrangements and service control are separated from one another, so that the IN services will be made independent of the connection arrangements. Equipment or a network element performing tasks assigned by the IN service control function or functions SCF (Service Control Function) is called a service control point SCP (Service Control Point). Within the scope of the present application the SCF and SCP are equal and hereinafter the term SCP will be used. The SCP gives call set-up instructions to the switching center or the switching center may query the SCP about call set-up instructions. Switching centers that are in charge of the intelligent network switching are called service switching points SSP (Service Switching Point). They comprise at least a service switching function SSF (Service Switching Function) and a call control function CCF (Call Control Function). The call control function CCF is not an IN-related function, but it is a standard switching center function comprising high-level call processing functions, such as establishment and release of transmission connections. The service switching function SSF is an interface between the call control function CCF and the service control point SCP. Within the scope of the present application, the service switching point SSP is equal in value to the functional entity formed by the CCF and SSF, and hereinafter the term SSP will be used.

In the conventional call set-up, effected without the assistance of the intelligent network, the switching center make independently all the deductions about call routing, In the intelligent network, deductions about routing are also made by the SCP. A basic call state model BCSM defined in connection with the intelligent network describes different phases of the call set-up, In the intelligent network specifications, call processing procedures to be effected at a switching point are roughly grouped into phases which are called 'points in call' PIC. When the phase PIC terminates, a detection point DP is in general encountered. Call set-up or release can be temporarily stopped at these detection points and further call processing instructions can be requested from the service control point SCP. Call control can be transferred to the service control point at these detection points. When a transition is made from the detection point DP to the phase PIC, the call control transfers to a switching point. In addition to PICs and detection DPs, the basic call state model BCSM comprises transitions and events. The transitions indicate proceeding of the basic call set-up from one PIC to another. The events cause transitions into and from the PIC. Messages between the service switching point and the control point are called operations. For instance, the SSP may involve a determination to continue, in response to a CollectInformation operation, the call set-up from PIC2 where information from the subscriber is collected. In connection with activation of an intelligent network service the SCP sends the SSP a RequestReportBCSMEvent operation, by means of which the SCP designates the detection points where it wishes to stop the call processing at a later stage of the call set-up and to assume the call control at that point for giving instructions to the switching point.

Collect Information PIC2 is one phase in the call set-up. It is normally encountered in the call set-up, when a phase is achieved where it has to be made sure that information has been obtained sufficiently. PIC2 is also encountered when the SCP requests to collect additional information with the CollectInformation operation. In this case, prior to the CollectInformation operation the control point SCP has transmitted the number of digits to be collected in the RequestReportBCSMEvent operation. This number indicates the maximum number of digits to be collected, which term will be used for it hereinafter. One digit refers to any one of figures 0 to 9 or some other character that can be used for call routing.

In PIC2 information is collected from the calling party from the sequence of dialled numbers. Such information includes e.g. service codes, prefixes, dialled address digits, et cetera. The switching point examines the received information. Phase exit events include: reception of complete information, collect time out, collect info failure, invalid information and calling party terminates the call. The reception of complete information is detected when the requisite number of dialled digits is collected or a string of digits ends in an end mark. The requisite number is either the maximum number transmitted in the CollectInformation operation by the SCP or a parameter determined for the SSP. The detection of this event results in encountering Information Collected DP2. Call processing is interrupted, the collected information is conveyed to the service control point, call control is transferred to the control point and the switching point remains waiting for instructions on how the call set-up will be continued, The Collect Time Out event is detected when a normal inter-digit timer expires and the maximum of additional information requested by the SCP has not been received in the course of the collecting time. The detection of this event causes a direct transition to PIC6 (Exception), in which the call is released. The Collect Info Failure event is detected when there is no digit receiver available at the service switching point, i.e. the resources of the switching point are engaged. The detection of this event will also lead to a direct transition to PIC6, in which the call is released. The Invalid Information event is detected when an error is found in the information received from the calling party. The detection of this event will also lead to a direct transition to PIC6, in which the call is released. The detection of the Calling Party Terminates the Call event results in encountering the detection point DP1O (O-Abandon) and the call will be released.

The above-described arrangement of Collect Information phase PIC2 has a drawback that the Collect Time Out event automatically releases the call without the service control point being able to interfere. The DP2 is designated as a detection point prior to a command, and the only way by which the SCP can interfere with the encounter is the maximum number of additional information digits. If the SCP service is based on the length of the dialled number and if signalling between the local switching center and the switching point that relays the numbers does not support the All Information Received mark, the IN services utilizing the number of dialled digits operate only within the areas of specific switching centers.

BRIEF DESCRIPTION OF THE INVENTION

The object of the invention is to provide a method and equipment implementing the method in such a way that the above drawbacks can be solved. The objects of the invention are achieved with method of exiting a collect information phase performed at i service switching point of an intelligent network, the method being characterized in that a maximum collecting time, which defines how long information collecting is allowed to take at most, is set as a condition in the collect phase, time consumed in the collect phase is compared with the maximum collecting time, the collect phase is exited in response to the expiring maximum collecting time and the call connection set-up control is transferred from the IN service switching point to the control point in response to the exit.

The invention further relates to a method of exiting the collect information phase performed at the IN service switching point, the method being characterized in that a minimum number, which defines how many digits at least have to be collected, is set as a condition in the collect phase, the number of the collected digits is compared with the minimum number when exiting the collect phase and the call connection set-up control is transferred from the IN service switching point to the control point, if there is at least the minimum number of collected digits.

The invention also relates to an intelligent network, to which the method of the invention can be applied. The intelligent network of the invention is characterized in that the service control point is arranged to determine the maximum collecting time it can wait for the information and to transmit the maximum collecting time to the service switching point, and the service switching point is arranged to receive the maximum collecting time and, in response to the expiring maximum collecting time, to send the collected information to the service control point and to transfer the call control to the service control point.

The invention further relates to an IN service switching point which can be utilized in the method and intelligent network in accordance with the invention. The IN service switching point of the invention is characterized by comprising reception means for receiving the condition of the information collecting operation from the service control point, the condition being the maximum duration for monitoring on information collecting time of a timer, setting means for setting the timer value to conform to the maximum time received from the control point, and transfer means responsive to the timer for transferring call control to the service control point.

Additionally, the invention further relates to an IN service switching point which can be utilized in the method and intelligent network in accordance with the invention. The IN service switching point of the invention is characterized by comprising reception means for receiving the condition of the information collecting operation from the service control point, the condition being the minimum length of the information to be collected, comparison means (CCF) for comparing the length of the collected information with the minimum length, and transfer means (SSF-FSM) responsive to the comparison means for transferring call control of the service control point.

Also, the invention further relates to an IN service control point which can be utilized in the method and intelligent network in accordance with the invention. The IN service control point of the invention is characterized by comprising determination means for determining the collecting time, which indicates for how long information will be collected at the service switching point, and transmission means are arranged to transmit the collecting time to the service switching point.

The invention is based on the idea that call control is returned to the service control point SCP even when in PIC2 the received information is not the maximum requested as additional information by the SCP. This enables the service control point to decide how the call will be continued. According to the prior art, the call is always released in these cases. Thus, an advantage of the invention is that the service control point can always make a decision on how the call will be continued on the basis of the received information irrespective of whether the requested amount of information is received or not. One more advantage of the invention is that its implementation only requires relatively insignificant changes at the IN service control point SCP and service switching point SSP.

In one preferred embodiment of the invention, the service control point SCP is able to influence how long the information will be waited for. This enables e.g. the IN services where a different amount of information in a specific time leads to a different facility, irrespective of whether, for instance, the relaying switching center supports the All Information Received mark or not. One more advantage of this embodiment is that it makes it possible to standardize the waiting time of collect information. The time of expiry of an inter-digit timer depends on the inter-exchange signalling and different signallings employ different times of expiry. Since the switching center receives calls through various incoming circuits, using different signallings, the waiting time of collect information varies in prior art solutions without the SCP having any influence on the collecting time.

In one preferred embodiment of the invention the service control point determines the minimum of the information to be collected. The minimum indicates how many digits the control point needs at least for continuation of the call set-up. When information collecting terminates, for instance, because the All Information Received mark was received or the inter-digit timer expired, call processing at the service switching point SSP is interrupted and it is checked whether information was received, at least the minimum sent by the control point. Call control is transferred to the control point and the switching point will remain waiting for instructions from the service control point only if at least the minimum amount of information is received. If the received information is less than the minimum amount, a transition to PIC6 is performed and the call will be released. This embodiment has an advantage that unnecessary signalling in the network is avoided in situations that result in releasing the call due to insufficient information.

The preferred embodiments of the method, intelligent network, IN service switching point and control point in accordance with the invention appear from the accompanying dependent claims 2, 4, 6, 8 and 11.

BRIEF DESCRIPTION OF THE DRAWINGS

In the following the invention will be described in greater detail in connection with preferred embodiments with reference to the accompanying drawings, in which.

DETAILED DESCRIPTION OF THE INVENTION

Figure 1:
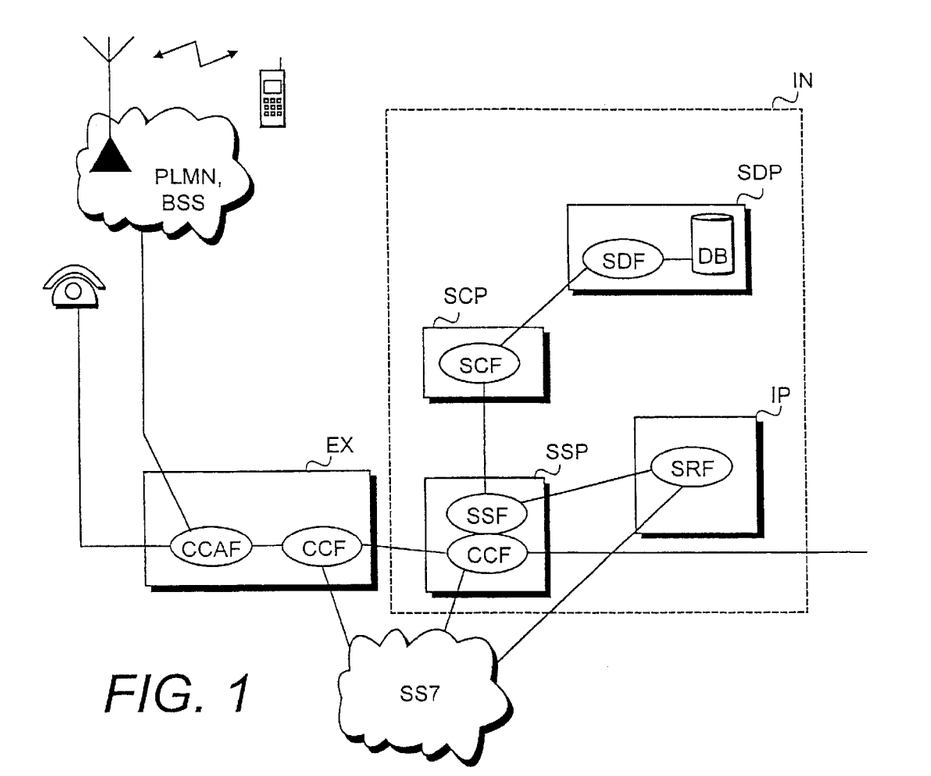
FIG. 1 illustrates an intelligent network (IN)

FIG. 1 illustrates an intelligent network IN and a few examples of telecommunication systems related thereto. FIG. 1 illustrates elements and functions that are essential from the viewpoint of IN services. Network elements which comprise a service switching function SSF and a call control function CCF are called service switching points SSPs. The call control function CCF is not an IN-related function, but it is a standard switching center function comprising the high-level call processing functions, such as establishment and release of transmission connections. The service switching function SSF is an interface between the call control function CCF and the service control point SCP. The SSF interprets the requests sent by the SCF and relays them to the CCP which starts the necessary call control functions. Correspondingly, the call control function CCF employs the SSF to request instructions from the SCF. The SSF is tightly coupled to the CCF whose interface it is. So each SSF together with the CCF is located at the same switching center. A service switching point of the invention is described in greater detail in connection with FIG. 5.

Network elements which comprise the service control function SCF are called a service control point SCP. The service control function is a centralized authority in the intelligent network comprising, for instance, an execution environment for service logic programs. In connection with an IN service, a service logic program is started at the service control point SCP and the operation of this program determines the instructions which the SCP transmits to the SSP in each call phase. Each program may have a plurality of instances to be executed. The service control point of the invention is described in greater detail in FIG. 6. The service control point SCP of FIG. 1 illustrates the service control point at its simplest, since it only comprises the service control function SCF and the necessary connections.

A service data function SDF is a database employed by the SCF. The service logic programs may query and update SDF information. For instance, subscriber-specific or service-number-specific information can be stored in the SDF. The SDF can be either a database management system at the service control point SCP or, as illustrated in FIG. 1, a separate database point SDP (Service Data Point) which supports the SCF-SDF interface and comprises a database DB.

A specialized resource function SRF, of the intelligent network is an interface for such network mechanisms that relates to interaction with the subscriber. The SRF can be associated with intelligent peripherals IPs which comprise more developed speech processing functions than the switching center or it can be located at the service switching point SSP.

In addition, FIG. 1 illustrates an exchange EX, not pertaining to the intelligent network, which, in addition to the CCF, comprises a call control agent function CCAF providing the users with access to the network. Because the EX comprises the CCAF, it may be e.g. a local exchange of a axed telephone network or a mobile telephone exchange controlling a base station sub-system BSS of a mobile network PLMN. The CCAF may also be located at the service switching point.

In FIG. 1, the network elements are interconnected by means of a signalling network SS7. Other networks, such as ISDN, can also be used.

Figure 2:
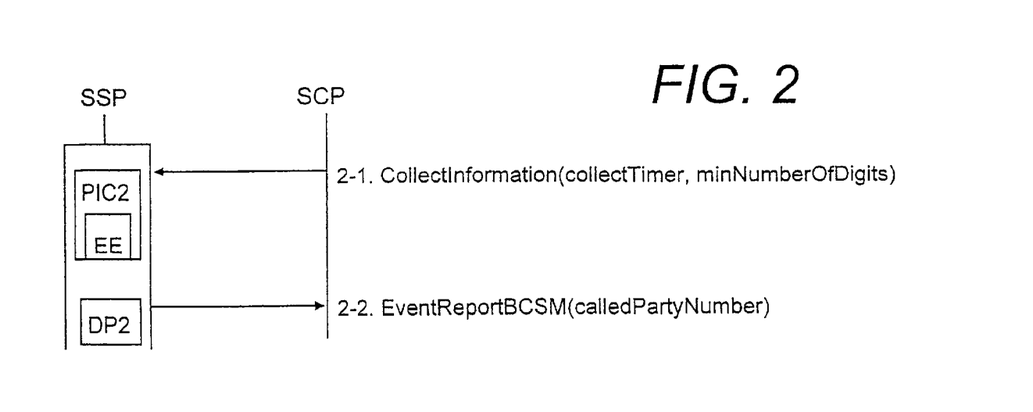
FIG. 2 illustrates signalling in a first preferred embodiment of the invention.

FIG. 2 illustrates a CollectInformation operation, which requests information to be collected, in a first preferred embodiment of the invention. At point 2-1 the service control point SCP transmits the Collectinformation operation to the service switching point SSP. Unlike the prior art, the operation comprises parameters. In the first preferred embodiment these parameters are: collectTimer, which determines the maximum time for information collecting; and minNumberOfDigits, which indicates the minimum number of digits to be collected. When the SSP receives the operation, it assumes the call set-up control and performs a transition to PIC2 Collectinginformation. In addition to the prior art exit events (not shown in the figure), the SSP provides for exiting PIC2 an exit event EE in which the maximum collecting time defined by the control point has expired and at least the minimum number of digits has been collected. The detection of the exit event PE causes the service switching point to exit PIC2 and to encounter the detection point DP2. The encounter with the detection point causes interruption in call processing at the service switching point SSP. At point 2-2 the service switching point SSP sends a prior art response operation EventReportBCSM to the service control point SCP, whereafter the call control transfers to the service control point and the SSP remains waiting for instructions from the service control point SCP. The parameter calledPartyNumber of the response operation includes the digits that were received within the maximum collecting time.

In a second preferred embodiment of the invention the exit event EE is detected when at least the minimum number of digits has been collected and either the inter-digit timer expires or the maximum collecting time is up. Otherwise the second preferred embodiment does not differ from the first preferred embodiment.

In a third preferred embodiment of the invention, only a maximum collecting time, collectTimer, is the parameter of the operation transmitted at point 2-1 In this case, the exit event EE is detected when the maximum collecting time is expired. Irrespective of the number of collected digits, a transition from PIC2 to the detection point DP2 is performed. Otherwise the third preferred embodiment does not differ from the first one.

In the third preferred embodiment of the invention, only a minimum number minNumberOfDigits is the parameter of the operation transmitted at point 2-1. In this case, the exit event EE is detected when at least the minimum number of digits has been collected and either the inter-digit timer expires or the string of digits ends in an end mark. Otherwise the third preferred embodiment does not differ from the first preferred embodiment.

The parameters transmitted in the operation of point 2-1, or one of them, could be relayed to the service switching point also in the initialization operation RequestReportBCSMevent by adding new parameters thereto. By sending the parameters in the CollectInformation operation the advantage is achieved that they are not sent until they are actually needed.

Figure 3:
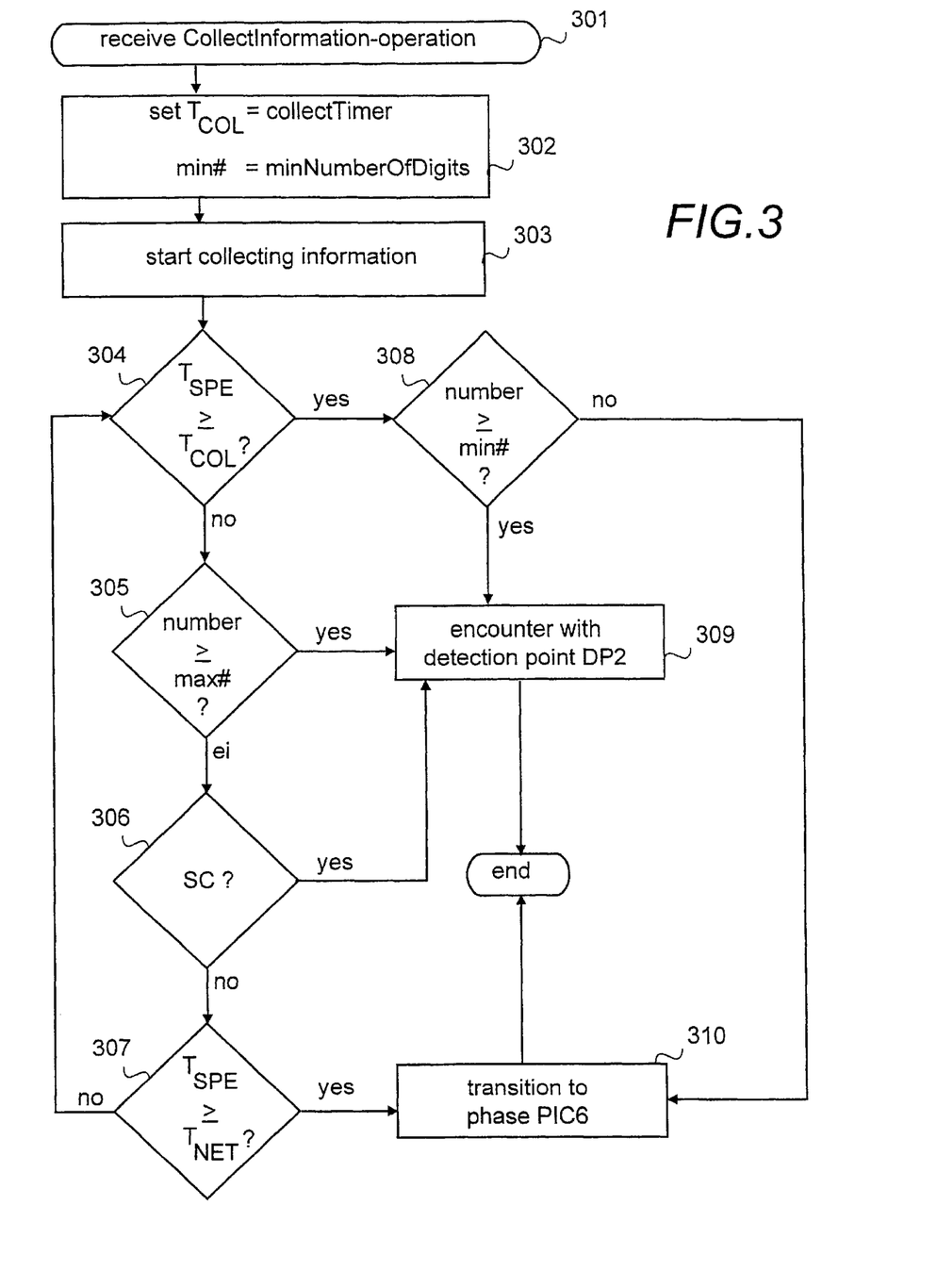
FIG. 3 is a flow chart of the first preferred embodiment of the invention.

The flow chart of FIG. 3 illustrates the IN operation in accordance with the invention at the service switching point SSP in the first preferred embodiment. It is assumed in the figure that the calling party does not disconnect the call, does not give invalid information, and that there are available resources at the service switching point. At point 301 the Collectinformation operation is received, whereafter, at point 302, conditions of the exit event of the invention are set for the maximum collecting time $T_{COL}$, which will have the parameter value of the maximum collecting time collectTimer described in connection with FIG. 2, and for the minimum number to be collected min#, which will have the parameter value of the minimum number of digits to be collected minNumberOfDigits described in connection with FIG. 2. Thereafter, the call control is transferred to the function CCF and at point 303 collection of information is started in a normal manner. Next, checking of points 304, 305, 306 and 307 is repeated until one of the conditions of the points is fulfilled. At point 304, it is checked whether the time $T_{SPE}$ spent for collecting information is at least the maximum collecting time $T_{COL}$. If $T_{SPE}$ is less than $T_{COL}$, a transition is performed to point 305, where it is checked, whether the number is the same or larger than the required number max. The required number is either the maximum number of requisite digits sent in the RequestReportBCS-MEvent operation by the control point or, if that is not received, the required number of digits set by the service switching point itself. If the number is less than max#, a transition is performed to point 306, where it is checked, whether the received information includes an acknowledgement SC (Send Completed), which indicates that the calling party has already given complete information. If the received information does not include the acknowledgement, a transition is performed to point 307, where it is checked, whether the time $T_{SPE}$ spent for collecting information is at least the time $T_{NET}$ which triggers the inter-digit timer for transmission network signalling. If not, a return to point 304 is performed.

If it is detected at point 304 that the maximum collecting time, i.e. $T_{SPE} \geq T_{COL}$, was spent for collecting information, a transition is performed to point 308, where it is checked, whether information was collected at least for the minimum amount of digits needed by the service control point, i.e. nr≧min#. If a sufficient number of digits was collected, a transition is performed to point 309, where a detection point DP2 Information Collected is encountered. In accordance with the prior ar, from point 309 the process continues by sending the collected digits to the control point and by transferring the call control to the control point. Point 309 is also entered from point 305, if the number of collected digits is at least the number required, i.e. nr≧max#, and from point 306 if the SC is received.

If the number of digits collected at point 308 is insufficient, i.e. nr<min#, the process will be continued from point 310, At point 310, a transition is made to PIC6 of the BCSM, where the call will be released. Point 310 can also be entered from point 307 if the time $T_{SPE}$ spent for collecting information is at least the time $T_{NET}$ which triggers the inter-digit timer for transmission network signalling.

In the second preferred embodiment the process proceeds as described above, with the exception that from point 307 a transition is performed to point 308, and not to point 310, if the time $T_{SPE}$ spent for collecting information is at least the time $T_{NET}$ which triggers the inter-digit timer for transmission network signalling. This enables the encounter with the detection point DP2 when the inter-digit timer expires, if digits have been collected sufficiently when the time which triggers the inter-digit timer is shorter than the maximum collecting time.

In the third preferred embodiment the process proceeds as in the first preferred embodiment with the exception that at point 302 only a value of the maximum collecting time $T_{COL}$ is given, and no checking on the number of collected digits is performed at point 308.

Figure 4:
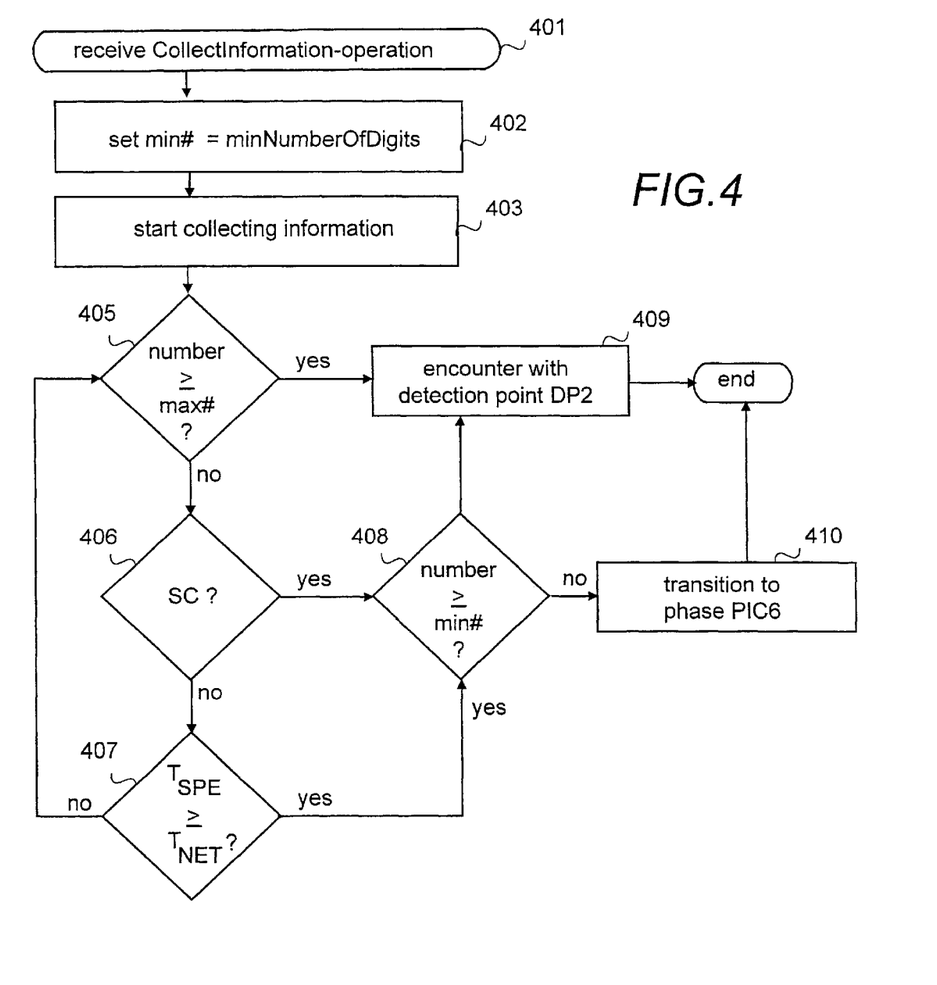
FIG. 4 is a flow chart of a third preferred embodiment of the invention.

The flow chart of FIG. 4 illustrates the IN operation in accordance with the invention at the service switching point SSP in a fourth preferred embodiment. It is assumed in the figure that the calling party does not disconnect the call, does not give invalid information and that there are available resources at the service switching point. At point 401 the Collectinformation operation is received, whereafter at point 402 a condition of the exit event of the invention is set for the minimum number min# to be collected, which will have the parameter value of the minimum number of digits to be collected minNumberOfDigits described in connection with FIG. 2. Thereafter the call control is transferred to the function CCF and at point 403 collection of information is started in a normal manner. Next, checking of points 405, 406 and 407 is repeated, until any one of the conditions of the points is fulfilled. At point 405 it is checked whether the number of collected digits nr is the same or larger than the required number max#. The required number is either the maximum number of requisite digits sent in the RequestReportBCSMEvent operation by the control point or, if that is not received, the required number of digits set by the service switching point itself. If the number is less than max#, a transition is performed to point 406, where it is checked, whether the received information includes an acknowledgement SC (Send Completed), which indicates that the calling party has already given complete information. If the received information does not include the acknowledgement, a transition is performed to point 407, where it is checked, whether the time $T_{SPE}$ spent for collecting information is at least the time $T_{NET}$ which triggers the inter-digit timer for transmission network signalling. If not, a return to point 405 is performed.

If it is detected at point 406 that the SC is received, a transition is performed to point 408, where it is checked, whether information was collected at least the minimum amount needed by the service control point, i.e. nr≧min#. Point 408 can also be entered from point 407, if the time $T_{SPE}$ spent for collecting information is at least the time $T_{NET}$ which triggers the inter-digit timer for transmission network signalling. If it is detected at point 408 that a sufficient number of digits was collected, a transition is performed to point 409, where a detection point DP2 Information_Collected is encountered. In accordance with the prior art, from point 409 the process continues by sending the collected digits to the control point and by transferring the call control to the control point. Point 409 is entered directly from point 405, if the number of collected digits is at least the number required, i.e. nr≧max#.

If it is detected at point 408 that the number of collected digits is not sufficient, i.e. nr<min#, the process continues from point 410. At point 410, a transition is made to PIC6 of the BCSM, in which the call will be released.

In another embodiment in accordance with the invention the point 408 can be entered either from point 406 or from point 407 but not from both.

The order of points in FIGS. 3 and 4 may deviate from what has been described in the above and they may occur in parallel. In addition, other checks, such am checking of invalid information, can be carried out. Furthermore, it is possible to combine the above-described embodiments. The service switching point can be arranged to give $T_{COL}$ a value which exceeds $T_{NET}$ and to give min# the value zero when said service switching point receives the Collectinformation operation in which the corresponding parameter has no value. Hence the service switching point can be connected to such service control points that do not support operation in accordance with the invention.

Figure 5:
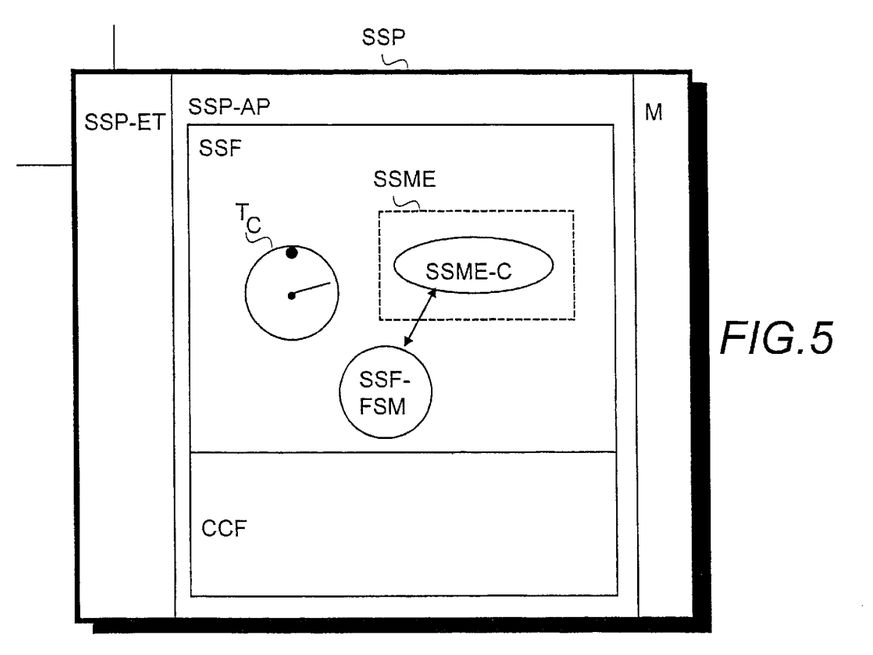
FIG. 5 illustrates an IN service switching point.

FIG. 5 illustrates the service switching point SSP and its essential functions from the viewpoint of the invention. The SSP can be implemented in conventional exchanges, provided that the exchange makes a distinction between the basic call control and the IN service control. The service switching point SSP comprises an exchange terminal SSP-ET for receiving signalling from other network nodes and for transmitting signalling to other network nodes and an application part SSP-AP which controls the exchange terminal. The application part SSP-AP comprises the actual functions of the exchange, i.e, the service switching function SSF and the call control function CCF, and depending on the exchange type, possibly also the CCAF. These functions are described in greater detail in connection with FIG. 1. The application part SSP-AP comprises a separate state model instance BCSM for each call, the BCSM being described in the above general part of the specification, and interface instances SSF-FSM (SSF Finite State Model instance). When IN service is needed, an SSF-FSM for relaying call processing instructions between the BCSM and the SCP is created for the call for an SCP connection. When the IN service is completed, the SSF-FSM will be terminated. The same state model instance BCSM may need a new IN service at some other call set-up phase, and consequently a new interface instance SSF-FSM will be created for it, The interface instances SSF-FSM related to the calls may occur in parallel and asynchronously.

The application part SSP-AP comprises a service switching management entity SSME for performing operations received from the IN service control point, for responding to them and for requesting instructions. The management entity SSME comprises a control unit SSME-C (SSME-Control) which maintains dialogue, on behalf of the interface instances SSF-FSM, with other parts of the switching point and other network nodes or functions, such as the service control point, of the intelligent network. It is in charge of the creation, invocation and maintenance of the interface instances SSF-FSM. The SSME-C directs the received operation to the relevant instance and creates an instance, if necessary.

In the first and second preferred embodiments of the invention the application part SSP-AP comprises a timer $T_c$, for the maximum information collecting time and a memory M for storing the minimum number min# of information for comparison. In the third preferred embodiment of the invention the SSP-AP does not need the memory M for storing the minimum number of information. Correspondingly, in the fourth preferred embodiment of the invention the SSP-AP does not need the timer $T_c$. The application part of the switching point is in charge of giving the timer $T_c$ the value of the maximum collecting time received from the control point and/or of storing the minimum in the memory M.

Instead of the timer $T_c$, the timer $T_{SSF}$ of the application of the service switching point can also be employed. However, a separate timer allows more versatile operations, for instance, when sending the Collectinformation operation twice in succession, since by using the separate timer, the timer value can be set for each time separately, and if necessary, to have a different value. If the timer of the application were used, the timer value could not be changed, since according to the prior art, only one value for one operation can be given to the timer of the application. Moreover, the use of the separate timer is simpler, since according to the prior art, the Collectinformation operation transfers the SSF-FSM to a state in which the timer of the application is not used. Also other operations result in a transfer to the same state, and they do not employ the timer.

Figure 6:
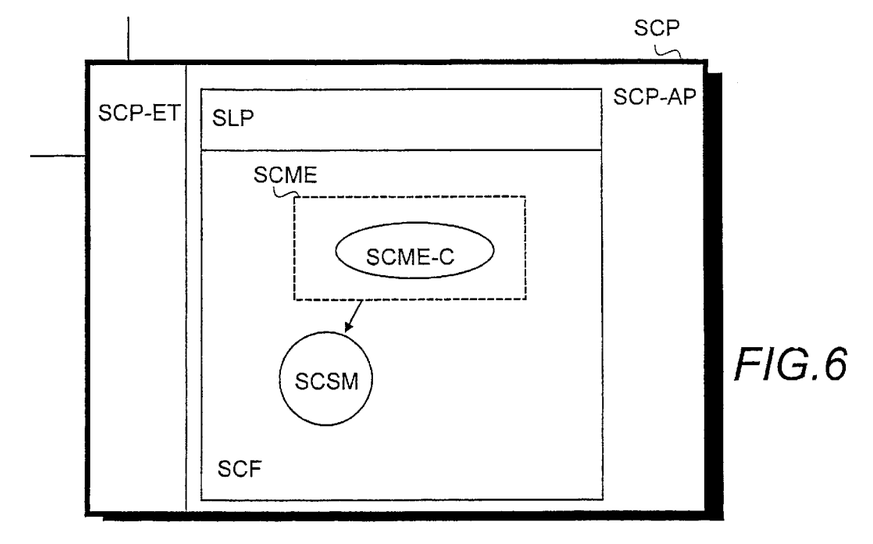
FIG. 6 illustrates an IN service control point.

FIG. 6 illustrates the service control point SCP and its essential functions from the viewpoint of the invention. The SCP comprises at least a terminal part SCP-TP for receiving signalling from other network nodes and for sending signalling to other network nodes, and an application part SCP-AP which controls the terminal part.

The application part SCP-AP comprises at least one service logic program SLP used for providing IN services and the service control function SCF described in connection with FIG. 1. In addition, the application part SCP-AP comprises SCF Call State Model instances SCSM. Every IN service request leads to creation of a call state model instance SCSM in accordance with the service logic program. The SCSM maintains dialogue with the SSF on behalf of the IN service logic program SLP with regard to that service of the call which resulted in creation of the call state model instance SCSM. The call state model instances SCSM related to different calls may occur in parallel and asynchronously. The application part SCP-AP additionally comprises a service control management entity SCME, which comprises a control unit SCME-C (SCME-Control), for sending operations to the service switching point. In a centralized manner the SCME-C is in charge of the dialogue of all IN-services-related instances SCSM with other parts of the control point and with other network nodes of the IN, such as the service switching point SSP and the service data function SDF. It is in charge of creating, invoking and maintaining the call state model instances SCSM. SSME-C In the embodiments of the invention, the application part SCP-AP comprises a software routine which takes care that the SCSM adds to the Collectinformation operation the parameters in accordance with the invention used in the embodiment, for instance, in the first and second preferred embodiments, the parameters shown in FIG. 2; in the third preferred embodiment, only the first of the parameters shown in FIG. 2, i.e. the timer value; and in the fourth preferred embodiment, only the latter of the parameters shown in FIG. 2, i.e the minimum number.

It is to be understood that the above specification and the drawings related thereto are only intended to illustrate the present invention. It is obvious to the person skilled in the art that the invention can be varied and modified in a variety of ways without deviating from the scope and the spirit of the invention disclosed in the appended claims.

What is claimed is:

1. A method of exiting a collect information phase performed at a service switching point of an intelligent network, the method comprising:

determining a maximum collecting time ad a condition for exiting the collect information phase, the maximum collecting time defining a maximum time information collecting is allowed to take;

comparing time spent at the collect information phase with the maximum collecting time;

exiting the collect information phase in response to an expiration of the maximum collecting time; and transferring call set-up control from an intelligent network service switching point to a service control point in response to the exiting of the collect information phase.

2. The method as claimed in claim 1, further comprising:
determining a value of the maximum collecting time at the service control point;
sending said value in an operation related to a collection of information to the service switching points and
setting said value as the maximum collecting time of the collect information phase.

3. A method of exiting a collect information phase performed at an intelligent network service switching point, the method comprising:
determining a minimum number as a condition for the collect information phase, the minimum number defining a minimum number of digits to be collected;
comparing a number of collected digits with the minimum number when exiting (408) the collect information phase; and
transferring call set-up control from the intelligent network service switching point to a service control point if the number of collected digits is at least the minimum number.

4. The method as claimed in claim 3, further comprising:
determining a value of the minimum number at the service control point;
sending said value in an operation related to a collection of information to the service switching point; and
setting said value as the minimum number.

5. An intelligent network comprising:
a service switching point constructed and arranged to connect the intelligent network to other data communication networks; and
a service control point configured to produce intelligent network services, the service control point being arranged to request the service switching point to collect information for continuing a call set-up requesting intelligent network service, wherein:
the service control point is arranged to determine a maximum collecting time to wait for the information and is arranged to send the maximum collecting time to the service switching point, and
the service switching point is arranged to receive the maximum collecting time and in response to an expiration of the maximum collecting time to send the collected information to the service control point and to transfer call control to the service control point.

6. The intelligent network as claimed in claim 5, wherein:
the service control point is further arranged to determine a minimum length of the information to be collected and to send a value of the minimum length to the service switching point, and
the service switching point is arranged to receive the value of the minimum length of the collected information and in response to the expiration of the maximum collecting time to send the collected information to the service control point and to transfer call control to the service control point, if length of the information collected by the service switching point is at least said minimum length.

7. An intelligent network service switching point arranged to be connected to an intelligent network service control points the service switching point comprising:
collecting means for collecting information from a calling party in response to a collect information operation received from the service control point;
reception means for receiving a condition of the collect information operation from the service control point, the condition being a maximum length of collecting time;
a timer arranged to monitor the information collecting time;
setting means for setting a value of the timer to conform to the maximum length of the collecting time received from the service control point; and
transfer means responsive to the timer for transferring the call control to service control point.

8. The intelligent network service switching point as claimed in claim 7, further comprising transmission means responsive to the transfer means for transmitting the information collected in a time period of the maximum time to the service control point.

9. An intelligent network service switching point arranged to be connected to an intelligent network service control point the service switching point comprising:
collecting means for collecting information from a calling party in response to a collect information operation received from the service control point;
reception means for receiving a condition of the collect information operation from the service control point, the condition being a minimum length of the information to be collected;
comparison means for comparing the collected information collected during a collect information phase with the minimum length; and
transfer means responsive to the comparison means for transferring call control to service control point.

10. An intelligent network service control point arranged to have a connection to a service switching point, the intelligent network service control point comprising:
control means for controlling a set-up of a call using an intelligent network service;
transmission means for transmitting instructions and information requests to the service switching point; and
determination means for determining a collecting time for a collect information phase, the collecting time indicating maximum time that can be used to collect information at the service switching point in the collect information phase,
wherein the transmission means is arranged to transmit the collecting time to the service switching point.

11. The intelligent network service control point as claimed in claim 10, wherein:
the determination means is arranged to determine a minimum number of digits to be collected in the collect information phase in order that the service control point could continue the call set-up,
the transmission means is arranged to transmit the minimum number to the service switching point.

12. An intelligent network service switching point arranged to be connected to an intelligent network service control point, the service switching point comprising:
a collecting mechanism to collect information from a calling party in response to a collect information operation received from the service control point;
a receiving mechanism to receive a condition of the collection information operation from the service control point, the condition being a maximum length of collecting time;
a timer arranged to monitor the information collecting time;
a setting mechanism to set a value of the timer to conform to the maximum length of the collecting time received from the service control point;

a transfer mechanism responsive to the timer to transfer call control to the service control.

13. The intelligent network service switching point as claimed in claim 12, further comprising a transmission mechanism responsive to the transfer mechanism to transfer the information collected in a time period of the maximum time to the service control point.

14. An intelligent network service switching point arranged to be connected to an intelligent network service control point, the service switching point comprising:
- a collecting mechanism to collect information from a calling party in response to a collect information operation received from the service control point;
- a reception mechanism to receive a condition of the collection information operation from the service control point, the condition being a minimum length of the information to be collected;
- a comparison mechanism to compare the collected information collected during a collect information phase with the minimum length; and
- a transfer mechanism responsive to the comparison mechanism to transfer call control to the service control point.

15. An intelligent network service control point arranged to have a connection to a service switching point, the intelligent network service control point comprising:
- a control mechanism to control a set-up of a call using an intelligent network service;
- a transmission mechanism to transmit instructions and information requests to the service switching point; and
- a determination mechanism to determine a collecting time for a collect information phase, the collecting time indicating maximum time that can be used to collect information at the service switching point in the collect information phase,
- wherein the transmission mechanism is arranged to transmit the collecting time to the service switching point.

16. The intelligent network service control point of claim 15, wherein:
- the determination mechanism is arranged to determine a minimum number of digits to be collected in the collect information phase in order that the service control point could continue the call set up,
- the transmission mechanism is arranged to transmit the minimum number to the service switching point.

* * * * *